(No Model.)

W. J. STILL.
STORAGE BATTERY.

No. 563,428. Patented July 7, 1896.

Witnesses.   Inventor.
W. J. Still.

THE NORRIS PETERS CO., PHOTO-LITHO., WASHINGTON, D. C.

UNITED STATES PATENT OFFICE.

WILLIAM JOSEPH STILL, OF TORONTO, CANADA, ASSIGNOR TO CHARLES RIORDAN, OF SAME PLACE.

STORAGE BATTERY.

SPECIFICATION forming part of Letters Patent No. 563,428, dated July 7, 1896.

Application filed September 18, 1894. Serial No. 523,379. (No model.) Patented in England September 26, 1894, No. 18,288; in Canada October 1, 1894, No. 47,117, and in France December 24, 1894, No. 243,893.

*To all whom it may concern:*

Be it known that I, WILLIAM JOSEPH STILL, electrician, of the city of Toronto, in the county of York, in the Province of Ontario, Canada, have invented certain new and useful Improvements in Storage Batteries, of which the following is a specification.

This invention has been patented to me in Canada, No. 47,117, dated October 1, 1894; in France, No. 243,893, dated December 24, 1894, and in England, No. 18,288, dated September 26, 1894.

My invention relates to improvements in storage batteries; and the object of the invention is, first, to provide a light, simple, and cheaply-constructed and durable electrode for storage batteries, which will afford the greatest practical surface exposure and the freest circulation of the current consistent with the durability of the element and efficiency of the service; secondly, to so construct the electrodes that they are insulated from one another, and, thirdly, to provide means whereby the expansion and contraction of the active material or oxid may be compensated for without detrimentally effecting the electrodes by buckling or bursting the plates or loosening the active material; and it consists, essentially, first, of constructing each electrode of a plurality of plates of lead, aluminium, or other suitable material arranged horizontally with alternate layers of oxid between them and connected together at the end by a suitable saddle attached to or forming part of the binding-post; secondly, of providing a top and bottom plate of rubber for each electrode with suitable laterally-extending lugs, through which extend hard-rubber bolts, which bind the electrode together, and, thirdly, of providing springs, preferably of rubber, beneath the tightening-nuts on the top of the bolts of each electrode, the electrodes being otherwise constructed in detail, as hereinafter more particularly explained.

Figure 1:
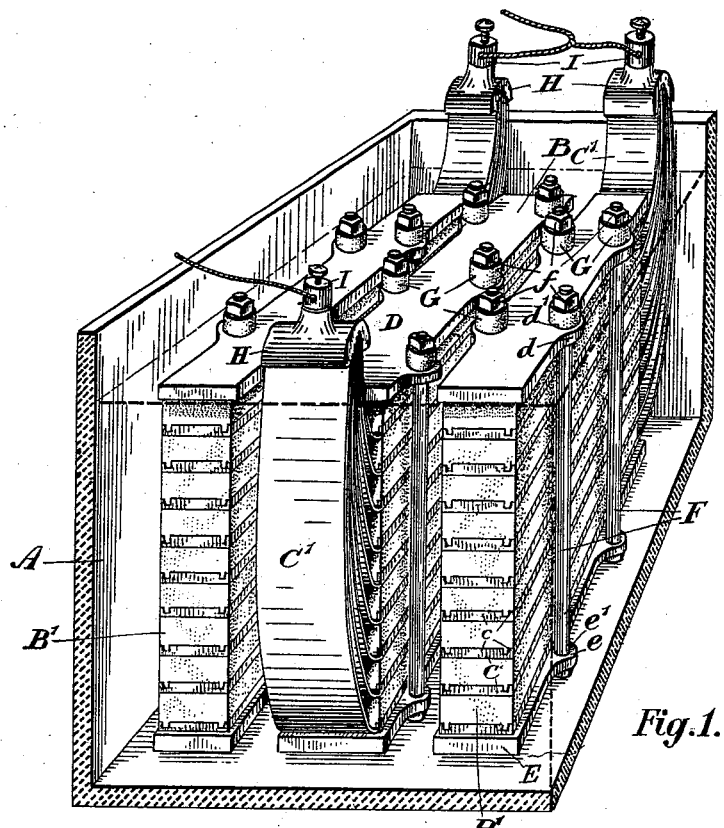
Figures 2, 3, 4:
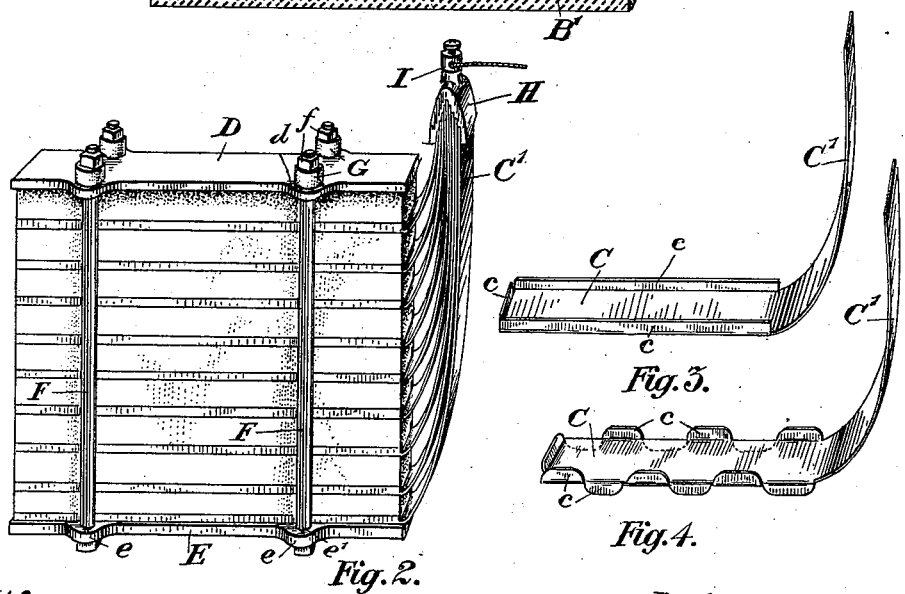

Figure 1 is a sectional perspective view of a cell comprised of three electrodes. Fig. 2 is a side perspective view of an electrode. Fig. 3 is a detail of one of the plates of the electrode. Fig. 4 is a view of an alternate form of plate.

In the drawings like letters of reference indicate corresponding parts in each figure.

A is the cell, and B the positive electrode, and B' the negative electrode, which are situated at each side of the positive electrode and are narrower than such electrode. Each electrode is comprised of a series of flat plates C, which have preferably turned-up or burred edges and ends forming lips c. The oxid is placed in layers of suitable thickness between the plates.

D and E are the top and bottom plates of the electrodes, which are made, preferably, of hard rubber wider than the plates C.

d and e are laterally-extending lugs, which have holes d' and e', respectively, through which extend the clamping-bolts F, which are also preferably made of hard rubber.

f are the nuts, which are screwed onto the threaded upper ends of the bolts and have situated between them and the lugs the rubber springs G.

The springs G are used to provide for the expansion and contraction of the oxid during the charging and discharging of the cells.

The ends C' of each plate C extend outwardly beyond the end of the oxid in the electrode and are turned upwardly and joined together and soldered to a saddle H, upon which is secured the binding-post I. It will be seen that the uppermost plates are necessarily shorter than those beneath them, in order to bring the ends C' of the conducting-plates C into the position shown in the drawings.

In Fig. 4 it will be seen that I form the plates C with the lips at the side turned partially upwardly and partially downwardly.

From the construction of my electrode it will be seen that the sulfuric acid in the cell will permeate through the oxid between the plates C, and that such oxid will be of a much greater quantity in proportion to the size of the electrode which is acted upon than any other electrode of which I am aware. It will also be seen that the conducting-plates are thoroughly insulated from each other and that the expansion or contraction of the active material or oxid is thoroughly compensated for by the rubber springs G, the strength of which may be adjusted to suit the expansion by means of the nuts $f$. Again, on account of the lips formed on each plate, the oxid is retained in position and there is no danger of buckling or bursting of the plates as is incident to most storage batteries now in use. By the form adapted it will be understood that it can be manufactured very cheaply and made very light, which is very essential where storage batteries are to be used for power purposes.

What I claim as my invention is—

1. In a storage battery, a series of conducting-plates all of the same polarity, interposed active material, elastic means for binding the plates together at right angles to their adjacent faces, all the plates having an unbroken surface extending from end to end, flexible bowed extensions from said plates of different length forming a wedge-shaped end and a correspondingly-shaped saddle as and for the purpose specified.

2. In a storage battery, in combination, a plurality of electrodes alternately negative and positive, laterally held securely together by a rigid containing-cell and each electrode consisting of a series of conducting-plates and interposed active material, elastic means for binding the plates of each electrode at right angles to the adjacent faces of the plates and vertical rubber rods abutting the outside of each electrode and so arranged that the rods of the adjacent electrode fit between each other and yet abut the electrodes on each side, as and for the purpose specified.

3. In a storage battery, an electrode comprising a plurality of integral rectangular sheet-metal plates narrow in width and horizontally arranged, all of the same polarity, and having the oxid arranged in alternate layers between the plates, the retaining insulating top and bottom plates having lateral projections extending out beyond each side of the conducting-plates and active material, hard-rubber bolts extending through the projections and arranged outside of the plates, so as to bind the electrode together and means for permitting a limited vertical movement of the plates upon the top end of the bolts, substantially as described.

4. In a storage battery, an electrode comprising a plurality of integral rectangular plates narrow in width and horizontally arranged and having the oxid arranged in alternate layers between the plates, the retaining insulating top and bottom plates having lateral projections, and hard-rubber bolts extending through the projections, the upper ends of the bolts being provided with springs interposed between the nuts and the plate so as to permit a limited expansion and contraction of the entire electrode as and for the purpose specified.

WILLIAM JOSEPH STILL.

Witnesses:
B. BOYD,
H. G. S. YOUNG.